April 5, 1938. A. MURRAY 2,113,309
SUPPORT FOR COPYING AND ENLARGING CAMERAS
Filed March 26, 1936
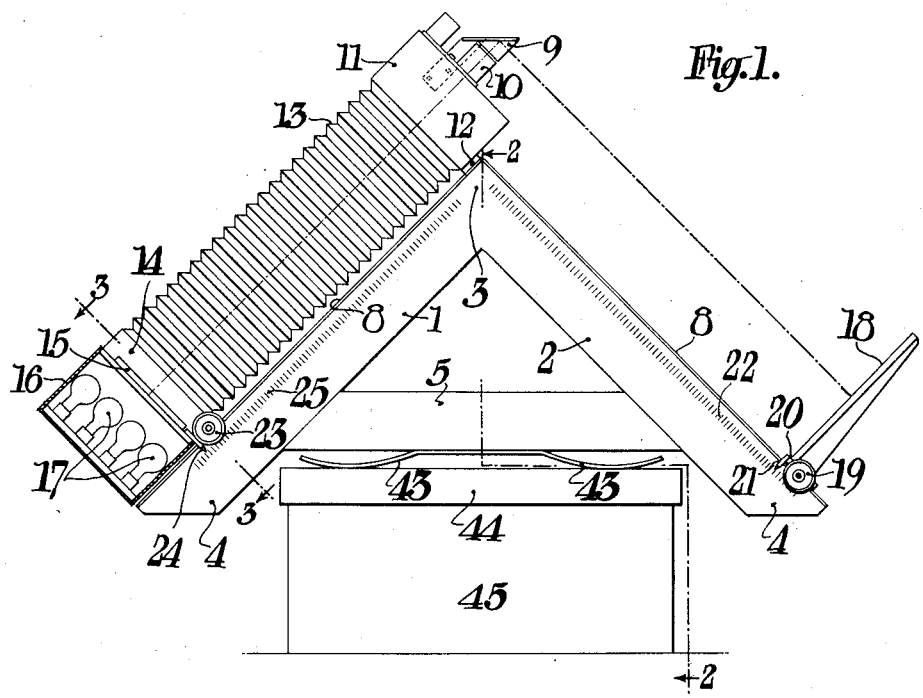
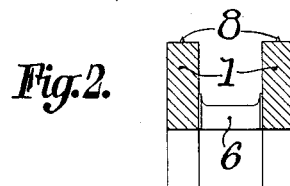
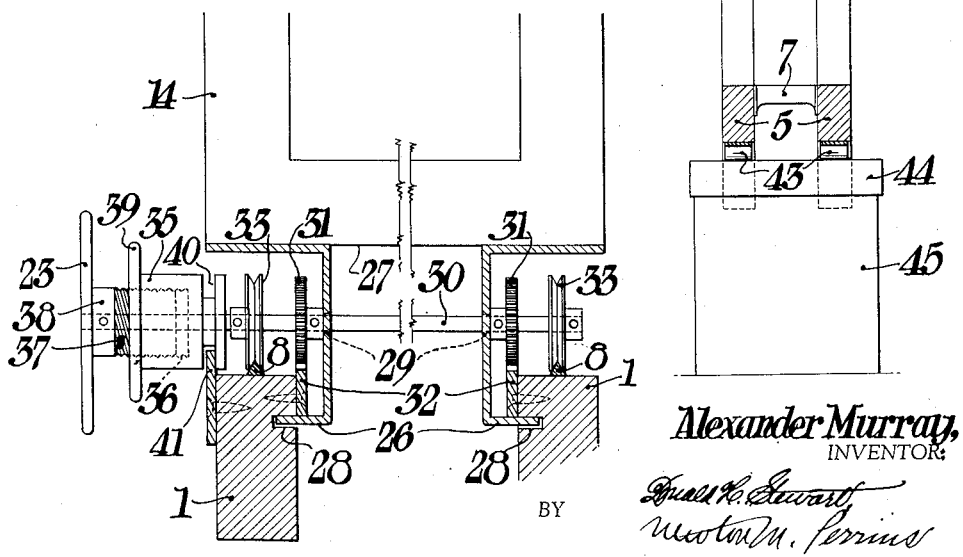
Alexander Murray,
INVENTOR
ATTORNEYS.

Patented Apr. 5, 1938

2,113,309

UNITED STATES PATENT OFFICE 2,113,309

SUPPORT FOR COPYING AND ENLARGING CAMERAS

Alexander Murray, Rochester, N. Y., assignor, by mesne assignments, to Eastman Kodak Company, Jersey City, N. J., a corporation of New Jersey Application March 26, 1936, Serial No. 70,920

2 Claims. (Cl. 88—24)

This invention relates to photography, and more particularly to copying and enlarging camera supports. One object of my invention is to provide a support of the class described in which the total over-all dimensions of the apparatus are materially reduced. Another object of my invention is to provide an apparatus of the type described in which the parts most used, such as the negative holder and paper easel, are both conveniently arranged and are accessible to an operator. Another object of my invention is to provide a supporting structure which may be made rigid, and in which the tracks on which the parts move are angularly disposed so that any backlash between the gears and racks on which the parts move may be automatically taken up by gravity. Still another object of my invention is to provide a supporting structure with a suitable spring suspension to prevent vibrations from a building from being transferred to the apparatus, and other objects will appear from the following specification, the novel features being particularly pointed out in the claims at the end thereof.

Coming now to the drawing, wherein like reference characters denote like parts throughout:

Fig. 1 is a side elevation of a support for copying and enlarging machines constructed in accordance with and embodying a preferred form of my invention.

Fig. 2 is a part section and part elevation taken on the line 2—2 of Fig. 1, the camera parts being omitted.

Fig. 3 is an enlarged fragmentary section taken on the line 3—3 of Fig. 1 and showing a preferred form of camera track construction.

In copying and enlarging cameras particularly of the type used for process work, it is desirable to have the parts so mounted that the negative holder and the easel are rigidly connected together and are readily accessible to an operator. Moreover, these cameras may be of considerable over-all size, and it is desirable to provide a support which will take up relatively little floor space and which at the same time will permit the necessary movement of the various parts.

In accordance with a preferred embodiment of my invention, the support for copying and enlarging cameras may consist of a pair of angularly disposed rails 1 and 2, rigidly connected together at the top 3 and slanting downwardly therefrom toward the floor—preferably at an angle of 90°. Toward the lower ends 4 of the rails 2, I provide a cross bar 5 which rigidly connects the parts together somewhat in the form of the letter A.

As indicated in Fig. 2, there are two of these supporting members similarly arranged and connected together by means of suitable braces 6 and 7, so that the pair of rails form supports for the V-shaped guides 8 on which the movable parts of the camera may travel.

For instance, in accordance with the showing of Fig. 1, I preferably mount a prism 9 in a fixed position at the apex of the support, there being an objective 10 carried by a lens board 11 which is preferably affixed at 12 to the top of the rails 1 and 2. A bellows 13 connects the lens board 11 with the camera body 14 which may be of any standard type adapted to receive a negative in the slideway 15. Attached to the camera body 14 is a suitable type of lamphouse indicated at 16, carrying a plurality of lamps 17 adapted to evenly illuminate a negative in the slideway 15 so that objective 10 and prism 9 may form an image of the negative upon a sensitized medium carried on the easel 18.

The easel 18 may be movably mounted on the rail members 8 by means of a hand wheel 19 which propels the carriage 20 and, if desired, a pointer 21 may indicate on a scale 22 the setting or degree of magnification. The camera body 14 is likewise provided with a hand wheel 23 for moving the camera carriage, as will be more fully hereinafter described, and the camera may carry a pointer 24 movable over a scale 25 to indicate the setting of the apparatus.

As best shown in Fig. 3, the camera 14 may be attached to the rails 1 by means of the flanges 26 which are carried on the bottom wall 27 of the camera, these flanges projecting into slots 28 in the rails 1 to guide the movement of the camera in a well-known manner. Members 26 are apertured at 29 to receive the shaft 30 to which pinions 31 are keyed, these pinions meshing with racks 32 also carried on the rails 1.

To support the weight of the camera the shaft 30 carries a pair of V-shaped rollers 33 which are adapted to run on the inverted V-shaped track members 8 attached to the rails 1. Thus, when the hand wheel 23 is turned to turn the shaft 30, the racks and pinions will cause the camera to move, and the wheels 33 and flanges 26 will guide the camera in its movement upon the rails.

Since the rails are arranged at an angle, it is necessary to lock the camera in any desired position, and this may be done by means of a locking nut 35 having an internal thread 36 meshing with the thread 37 on the hub 38 of the hand wheel 23. Member 35 carries a hand wheel 39 by which it may be turned, and it is grooved at 40 so that it may normally slide on the flange 41 attached to the supporting rail 1. Thus, when the camera has been placed in the desired position, a turn of the hand wheel 39 in either direction will cause the slot 40 to bind against the flange 41, definitely retaining the camera in its set position. The hand wheel 19 may operate a similar structure to lock the easel 19 in any definite position.

The cross bars 5 which tie the rails 1 and 2 together are preferably provided with spring members 43, these spring members resting on the top of a short table-like structure 44, this top being spaced from the floor by a housing 45. The height of the table top 4 is preferably arranged so that both the camera and easel are convenient for an operator.

There are many advantages in having a supporting structure for a copying and enlarging camera with angularly arranged sides. The camera body and the easel both tend to move toward the bottom of their relative supporting rails 1 and 2, and consequently any play that exists between the pinions 31 and the racks 32 is definitely taken up by gravity. This greatly facilitates the proper positioning of the camera body 14 and the easel 18, since there is no tendency for these parts to move, as the locking wheel is used to bind against the holding flange after these parts have been properly positioned.

The floor space taken up by the apparatus is very greatly reduced without sacrificing the convenience of operation of the support. For instance, with a typical camera having, for example, a five-foot extension on each side of the prism, the camera can be arranged so that it is only eight feet, eight inches over-all and five feet, ten inches in height from the floor. A camera of the same capacity horizontally arranged would extend in the neighborhood of eleven feet, so that materially less floor space is taken up.

In addition, two frames constructed in the form of the letter A, joined together by suitable braces, can be made extremely rigid for their weight, and thus produce a desirable frame for holding the relatively heavy camera parts. Also, the easel and the camera body are at a convenient height to be used by an operator, and at the same time the objective 10 is not spaced so far above the floor that it is operated only with difficulty.

While I have illustrated a preferred form of my invention, it is obvious that certain changes and alterations can be made without departing from my invention as defined in the following claims.

What I claim as new and desire to secure by Letters Patent of the United States is:

1. A support for a copying and enlarging machine comprising a horizontal supporting member, and two tracks inclined upwardly from spaced parts of the horizontal base, the angle of each track member being the same, said tracks meeting at an apex spaced from the horizontal support, and a prism fixedly mounted above the apex of the track members, one side of said prism being parallel to said support, negative and paper holders carried by said angularly disposed tracks near said supports, and rack and pinions carried by the tracks and negative and paper holders, the inclination of the tracks automatically taking up lost motion between the racks and pinions whereby accurate adjustments of the parts can be accomplished.

2. A support for a copying and enlarging machine comprising a horizontal supporting member, and two tracks inclined upwardly from spaced parts of the horizontal base, the angle of each track member being the same, said tracks meeting at an apex spaced from the horizontal support, a prism fixedly mounted above the apex of the track members, one side of said prism being parallel to said support, a negative holder, a paper holder, a rack on each inclined track member, and a pinion carried by each holder and meshing with a rack, whereby said holders may be moved toward and from said horizontal base by means of said pinions and racks.

ALEXANDER MURRAY.